(12) United States Patent
Dhaens et al.

(10) Patent No.: US 12,083,848 B1
(45) Date of Patent: Sep. 10, 2024

(54) SINGLE AXLE ROLL CONTROL SYSTEM WITH DUAL IMPELLER PUMP ARRANGEMENT

(71) Applicant: DRiV Automotive Inc., Northville, MI (US)

(72) Inventors: Miguel Dhaens, Lommel (BE); Monzer Al Sakka, Sint-Truiden (BE)

(73) Assignee: DRiV Automotive Inc., Northville, MI (US)

( * ) Notice: Subject to any disclaimer, the term of this patent is extended or adjusted under 35 U.S.C. 154(b) by 0 days.

(21) Appl. No.: 18/197,142

(22) Filed: May 15, 2023

(51) Int. Cl.
*B60G 17/08* (2006.01)
*B60G 13/08* (2006.01)
*F15B 1/04* (2006.01)
*F15B 13/06* (2006.01)

(52) U.S. Cl.
CPC .............. *B60G 17/08* (2013.01); *B60G 13/08* (2013.01); *F15B 1/04* (2013.01); *F15B 13/06* (2013.01); *B60G 2202/24* (2013.01); *B60G 2204/62* (2013.01); *B60G 2500/104* (2013.01)

(58) Field of Classification Search
CPC .... B60G 17/08; B60G 13/08; B60G 2202/24; B60G 2204/62; B60G 2500/104; F15B 1/04; F15B 13/06
See application file for complete search history.

(56) References Cited

U.S. PATENT DOCUMENTS

| | | |
|---|---|---|
| 2,503,016 A | 4/1950 | Weeks et al. |
| 3,328,019 A | 6/1967 | Wilson |
| 3,475,059 A | 10/1969 | Christof |
| 3,871,635 A | 3/1975 | Unruh et al. |

(Continued)

FOREIGN PATENT DOCUMENTS

| | | |
|---|---|---|
| CN | 105857007 A | 8/2016 |
| DE | 19853876 A1 | 5/2000 |

(Continued)

OTHER PUBLICATIONS

U.S. Appl. No. 18/197,126, filed May 15, 2023, Miquel Dhaens et al.

(Continued)

*Primary Examiner* — Toan C To
(74) *Attorney, Agent, or Firm* — Harness, Dickey & Pierce, P.L.C.

(57) ABSTRACT

A single axle suspension system including right and left dampers, first and second hydraulic circuits, one or more pressurizing mechanisms with a variable volume chamber that is connected in fluid communication with the first or second hydraulic circuits, and a bi-directional pump with a first impeller that is arranged in fluid communication with the first hydraulic circuit, a second impeller that is arranged in fluid communication with the second hydraulic circuit, and a motor that is configured to drive rotation of the first and second impellers to simultaneously pump the hydraulic fluid through the first and second hydraulic circuits in opposite directions. Each pressurizing mechanism includes a driven piston that is moveable in first and second directions to increase and decrease the volume of the variable volume chamber and therefore increase and decrease static pressure within the first and/or second hydraulic circuits independent of damper movements.

20 Claims, 5 Drawing Sheets

(56) References Cited

U.S. PATENT DOCUMENTS

| | | | |
|---|---|---|---|
| 3,921,746 A | 11/1975 | Lewus | |
| 4,295,538 A | 10/1981 | Lewus | |
| 4,741,206 A | 5/1988 | Ishiguro et al. | |
| 5,562,305 A | 10/1996 | Heyring et al. | |
| 5,573,388 A | 11/1996 | Tar et al. | |
| 5,682,980 A * | 11/1997 | Reybrouck | B60G 17/04 280/124.16 |
| 5,899,472 A | 5/1999 | Burke et al. | |
| 6,010,139 A | 1/2000 | Heyring et al. | |
| 6,196,555 B1 | 3/2001 | Gaibler | |
| 6,669,208 B1 | 12/2003 | Monk et al. | |
| 7,240,906 B2 | 7/2007 | Klees | |
| 7,384,054 B2 | 6/2008 | Heyring et al. | |
| 7,686,309 B2 | 3/2010 | Munday et al. | |
| 7,751,959 B2 | 7/2010 | Boon et al. | |
| 7,909,341 B2 | 3/2011 | Van Der Knaap | |
| 7,959,164 B2 | 6/2011 | Keane et al. | |
| 8,123,235 B2 | 2/2012 | Monk et al. | |
| 8,544,863 B2 | 10/2013 | Revill et al. | |
| 8,967,629 B2 | 3/2015 | Oshita et al. | |
| 9,352,633 B2 | 5/2016 | Kim | |
| 10,358,010 B2 | 7/2019 | Boon et al. | |
| 10,434,835 B2 * | 10/2019 | Six | F15B 13/027 |
| 10,589,591 B2 | 3/2020 | Sakka et al. | |
| 10,850,586 B2 | 12/2020 | Sorniotti et al. | |
| 11,084,349 B2 | 8/2021 | Dhaens et al. | |
| 11,117,435 B2 | 9/2021 | Liebold et al. | |
| 11,192,424 B2 | 12/2021 | Tabata et al. | |
| 11,220,152 B2 | 1/2022 | Witte | |
| 11,338,637 B2 | 5/2022 | Dhaens et al. | |
| 11,351,829 B2 | 6/2022 | Stahl | |
| 11,351,830 B2 | 6/2022 | Sorniotti et al. | |
| 11,376,917 B2 | 7/2022 | Simon et al. | |
| 11,541,797 B2 | 1/2023 | Dhaens | |
| 11,577,572 B2 | 2/2023 | Dhaens | |
| 11,679,820 B2 * | 6/2023 | Streit | B60G 99/002 280/124.106 |
| 11,685,220 B2 | 6/2023 | Calchand et al. | |
| 11,794,542 B2 | 10/2023 | Boulay et al. | |
| 11,865,887 B2 | 1/2024 | Boon et al. | |
| 11,970,034 B2 | 4/2024 | Kalnitski et al. | |
| 2004/0113377 A1 | 6/2004 | Klees | |
| 2006/0287791 A1 | 12/2006 | Boon et al. | |
| 2007/0170680 A1 | 7/2007 | Knaap | |
| 2012/0098216 A1 | 4/2012 | Ryan et al. | |
| 2014/0225336 A1 | 8/2014 | Ryan et al. | |
| 2014/0232082 A1 | 8/2014 | Oshita et al. | |
| 2018/0162188 A1 | 6/2018 | Chikamatsu et al. | |
| 2018/0229574 A1 * | 8/2018 | Okimura | B60G 15/14 |
| 2018/0345747 A1 | 12/2018 | Boon et al. | |
| 2019/0225044 A1 | 7/2019 | Witte | |
| 2019/0263213 A1 | 8/2019 | Sakka et al. | |
| 2019/0305558 A1 * | 10/2019 | Abaitancei | B60T 1/10 |
| 2020/0062069 A1 | 2/2020 | Sorniotti et al. | |
| 2020/0180386 A1 | 6/2020 | Tabata et al. | |
| 2020/0238780 A1 | 7/2020 | Dhaens et al. | |
| 2020/0238876 A1 | 7/2020 | Dhaens | |
| 2020/0247207 A1 | 8/2020 | Dhaens et al. | |
| 2021/0023902 A1 | 1/2021 | Sorniotti et al. | |
| 2021/0061046 A1 | 3/2021 | Simon et al. | |
| 2021/0155068 A1 | 5/2021 | Stabel | |
| 2021/0362557 A1 | 11/2021 | Stahl | |
| 2022/0001713 A1 | 1/2022 | Huth et al. | |
| 2022/0144035 A1 * | 5/2022 | Al Sakka | B60G 17/08 |
| 2022/0281278 A1 | 9/2022 | Boulay et al. | |
| 2022/0281280 A1 | 9/2022 | Praet et al. | |
| 2022/0380004 A1 * | 12/2022 | Walker | B63B 39/00 |
| 2022/0410647 A1 | 12/2022 | Dhaens | |
| 2023/0110337 A1 | 4/2023 | Calchand et al. | |
| 2023/0111977 A1 | 4/2023 | Boon et al. | |
| 2023/0112405 A1 | 4/2023 | Calchand et al. | |
| 2023/0113819 A1 * | 4/2023 | Vandersmissen | B60G 17/0152 280/5.507 |
| 2023/0114717 A1 | 4/2023 | Boon et al. | |
| 2023/0115594 A1 | 4/2023 | Calchand et al. | |
| 2023/0278387 A1 | 9/2023 | Birch et al. | |
| 2023/0302865 A1 | 9/2023 | Tong et al. | |
| 2023/0302866 A1 | 9/2023 | Tong et al. | |
| 2023/0302867 A1 | 9/2023 | Tong et al. | |

FOREIGN PATENT DOCUMENTS

| | | |
|---|---|---|
| DE | 102008027134 A1 | 12/2009 |
| DE | 102009010850 A1 | 9/2010 |
| DE | 102017214264 A1 | 2/2019 |
| EP | 4032732 A1 | 7/2022 |
| FR | 2907377 B1 | 1/2012 |
| GB | 2238990 A | 6/1991 |
| GB | 2315248 A | 1/1998 |
| GB | 2597454 A | 2/2022 |
| GB | 2597455 A | 2/2022 |
| JP | 2005059613 A | 3/2005 |
| JP | 2010522112 A | 7/2010 |
| JP | 5929628 B2 | 6/2016 |

OTHER PUBLICATIONS

U.S. Appl. No. 18/197,130, filed May 15, 2023, Miquel Dhaens et al.

U.S. Appl. No. 18/197,133, filed May 15, 2023, Miquel Dhaens et al.

U.S. Appl. No. 18/197,138, filed May 15, 2023, Miquel Dhaens et al.

U.S. Appl. No. 18/324,486, filed May 26, 2023, Miquel Dhaens et al.

* cited by examiner

SINGLE AXLE ROLL CONTROL SYSTEM WITH DUAL IMPELLER PUMP ARRANGEMENT

FIELD

The present disclosure relates generally to suspension systems for motor vehicles and more particularly to single axle suspension systems that replace or augment mechanical stabilizer bars/anti-roll bars.

BACKGROUND

The statements in this section merely provide background information related to the present disclosure and may not constitute prior art.

Suspension systems improve the ride of a vehicle by absorbing bumps and vibrations that would otherwise unsettle the vehicle body. Suspension systems also improve safety and control by improving contact between the ground and the tires of the vehicle. One drawback of suspension systems is that basic spring/damper arrangements will allow the vehicle to roll/lean during corning (i.e., in turns). The lateral acceleration the vehicle experiences in turns causes a roll moment where the vehicle will lean/squat to the right when turning left and to the left when turning right. The roll moment decreases grip and cornering performance and also can be uncomfortable to the driver and passengers. Many vehicles are equipped with stabilizer bars/anti-roll bars, which are mechanical systems that help counteract the roll moment experienced during cornering. Stabilizer bars/anti-roll bars are typically mechanical linkages that extend laterally across the width of the vehicle between the right and left dampers. When one of the dampers extends, the stabilizer bar/anti-roll bar applies a force to the opposite damper that counteracts the roll moment of the vehicle and helps to correct the roll angle to provide flatter cornering. However, there are several drawbacks associated with these mechanical systems. First, there are often packaging constraints associated with mechanical systems because a stabilizer bar/anti-roll bar requires a relatively straight, unobstructed path across the vehicle between the right and left dampers. Second, stabilizer bars/anti-roll bars are reactive and therefore only work when the suspension starts moving (i.e. leaning). Such mechanical systems do not limit body roll the moment a turn is initiated. Accordingly, there remains a need for improved vehicle suspension systems that can augment or replace traditional mechanical stabilizer bars/anti-roll bars.

SUMMARY

This section provides a general summary of the disclosure, and is not a comprehensive disclosure of its full scope or all of its features.

In accordance with one aspect of the subject disclosure, a single axle suspension system is provided. The single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The single axle suspension system also includes first and second hydraulic circuits that extend between and interconnect the working chambers of the right and left dampers. At least one pressurizing mechanism is provided with a variable volume chamber that is connected in fluid communication with at least one of the first and second hydraulic circuits. The at least one pressurizing mechanism includes a driven piston that is moveable in first and second directions to increase and decrease the volume of the variable volume chamber and therefore increase and decrease static pressure within the first and/or second hydraulic circuits independent of damper movements. A bi-directional pump is also provided with a first impeller that is arranged in fluid communication with the first hydraulic circuit, a second impeller that is arranged in fluid communication with the second hydraulic circuit, and a motor that is configured to drive rotation of the first and second impellers. The motor and impellers operate in a first roll control operating mode to pump hydraulic fluid through the first hydraulic circuit from the right damper to the left damper and to pump hydraulic fluid through the second hydraulic circuit from the left damper to the right damper. The motor and impellers operate in a second roll control operating mode to pump hydraulic fluid through the first hydraulic circuit from the left damper to the right damper and to pump hydraulic fluid through the second hydraulic circuit from the right damper to the left damper.

In accordance with another aspect of the present disclosure, the single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The single axle suspension system includes a first hydraulic line that extends between and fluidly connects the first working chamber of the right damper and the first working chamber of the left damper and a second hydraulic line that extends between and fluidly connects the second working chamber of the right damper and the second working chamber of the left damper. At least one pressurizing mechanism is provided with a variable volume chamber that is connected in fluid communication with at least one of the first and second hydraulic lines. The at least one pressurizing mechanism includes a driven piston that is moveable in first and second directions to increase and decrease the volume of the variable volume chamber and therefore increase and decrease static pressure within the first and/or second hydraulic lines independent of damper movements. A bi-directional pump is also provided with a first impeller that is arranged in fluid communication with the first hydraulic line, a second impeller that is arranged in fluid communication with the second hydraulic line, and a motor that is configured to drive rotation of the first and second impellers to simultaneously pump the hydraulic fluid through the first and second hydraulic lines in opposing directions.

In accordance with another aspect of the present disclosure, the single axle suspension system includes right and left dampers. Each of the right and left dampers includes a damper housing, a piston rod, and a piston that is mounted on the piston rod. The piston is arranged in sliding engagement inside the damper housing such that the piston divides the damper housing into first and second working chambers. The single axle suspension system includes a first hydraulic line that extends between and fluidly connects the first working chamber of the right damper and the second working chamber of the left damper and a second hydraulic line that extends between and fluidly connects the second working chamber of the right damper and the first working chamber of the left damper. At least one pressurizing mechanism is provided with a variable volume chamber that is connected in fluid communication with at least one of the first and second hydraulic lines. The at least one pressurizing mechanism includes a driven piston that is moveable in first and second directions to increase and decrease the volume of the variable volume chamber and therefore increase and decrease static pressure within the first and/or second hydraulic lines independent of damper movements. A bi-directional pump is also provided with a first impeller that is arranged in fluid communication with the first hydraulic line, a second impeller that is arranged in fluid communication with the second hydraulic line, and a motor that is configured to drive rotation of the first and second impellers to simultaneously pump the hydraulic fluid through the first and second hydraulic lines in opposing directions.

Advantageously, the single axle suspension systems described herein are able to reduce/eliminate vehicle roll while cornering for improved grip, performance, handling, and braking. The reduction of roll angles improves the comfort, steering feel, agility, and stability of the vehicle. Roll control is provided by actuating the first and second pressurizing mechanisms to increase the roll stiffness of the suspension system based on static pressure in the system. Because the pressurizing mechanisms actively adjusts roll stiffness of the vehicle by changing the static pressure in the system when greater roll stiffness is need, the baseline roll stiffness can be reduced compared to a vehicle with a conventional anti-roll bar. Therefore, ride comfort and suspension compliance is improved. Comfort is also improved because the active forces are independent of the damping forces. Anti-roll stiffness can also be applied to reduce body oscillations (e.g. sway) resulting in improved comfort. Finally, the single axle suspension systems described herein provide anti-roll control and therefore can augment or replace mechanical stabilizer bars/anti-roll bars.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Figure 1:
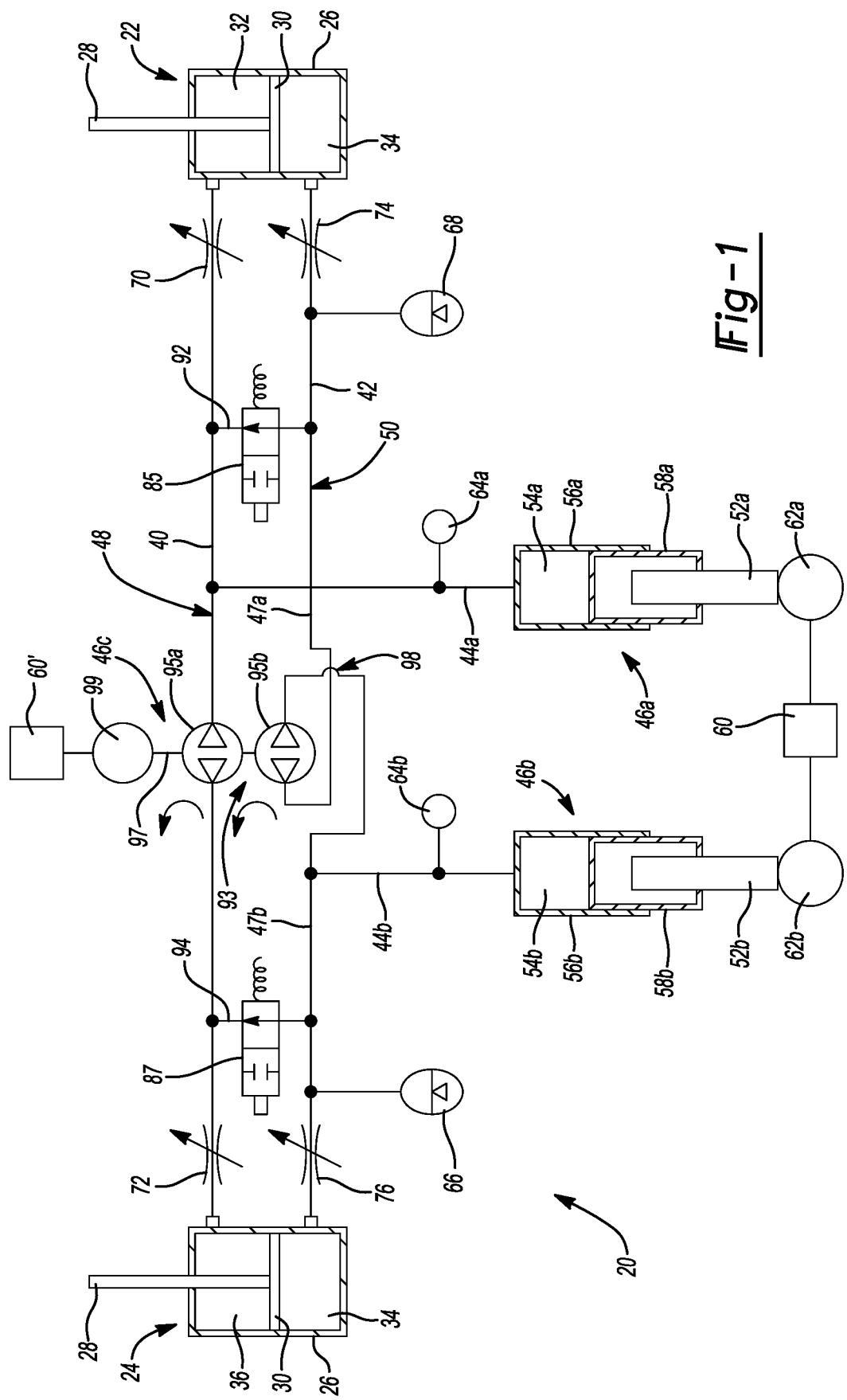
FIG. 1 is a schematic diagram illustrating an exemplary single axle suspension system that is constructed in accordance with the present disclosure, where the single axle suspension system includes first and second pressurizing mechanisms that have driven pistons and variable volume chambers and a third pressurizing mechanisms in the form of a dual impeller bi-directional pump that is arranged in fluid communication with two parallel hydraulic circuits.

Referring to the Figures, wherein like numerals indicate corresponding parts throughout the several views, a number of single axle suspension system are disclosed.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-5, several single axle suspension systems are illustrated. It should be appreciated that the single axle suspension systems shown in FIGS. 1-5 may be located at the front end of a vehicle to control suspension movements and provide anti-roll/lean control for the front wheels of the vehicle, and additionally or alternatively, the single axle suspension systems may be located at the rear end of the vehicle to control suspension movements and provide anti-roll/lean control for the back wheels of the vehicle.

Each of the single axle suspension systems disclosed herein include a right damper and a left damper. The right and left dampers control (i.e., dampen) up and down (i.e., vertical) movements of the front or rear wheels of the vehicle. Thus, one single axle suspension system may be provided at the front of the vehicle and another single axle suspension system may be provided at the rear of the vehicle. The anti-roll/lean capabilities of the single axle suspension systems described herein will be explained in greater detail below; however, it should be appreciated that each single axle suspension system can operate independently and on its own and that each single axle suspension systems can be used to either augment or completely replace mechanical stabilizer bars/anti-roll bars. Such mechanical systems require relatively straight, unobstructed runs along each axle between the right and left dampers. Accordingly, the single axle suspension systems disclosed herein offer packaging benefits because the right and left dampers only need to be hydraulically connected to one another.

It should be appreciated that a vehicle may be equipped with two identical single axle suspension systems placed at the front and rear of the vehicle; however, other configurations are possible where the vehicle may include only one of the single axle suspension systems disclosed herein and a convention suspension system at the other axle, or where the single axle suspension system at the front of the vehicle is different from the single axle suspension system at the rear of the vehicle.

With reference to FIG. 1, a single axle suspension system 20 is illustrated with right and left dampers 22, 24. Each of the right and left dampers 22, 24 of the single axle suspension system 20 includes a damper housing 26, a piston rod 28, and a piston 30 that is mounted on the piston rod 28. The piston 30 is arranged in sliding engagement with the inside of the damper housing 26 such that the pistons 30 divide the damper housings 26 into first and second working chambers 32, 34, 36, 38. Although other configurations are possible, in the illustrated embodiment the pistons 30 in the right and left dampers 22, 24 are closed pistons with no fluid flow paths defined within or by their structure.

The single axle suspension system 20 includes a plurality of hydraulic lines 40, 42, 44a, 44b. The plurality of hydraulic lines 40, 42, 44a, 44b includes: a first hydraulic line 40 that extends between and fluidly connects to the first working chamber 32 of the right damper 22 and the first working chamber 36 of the left damper 24, a second hydraulic line 42 that extends between and fluidly connects to the second working chamber 34 of the right damper 22 and the second working chamber 38 of the left damper 24, and a third hydraulic line 44a that extends between and fluidly connects the first hydraulic line 40 to a first pressurizing mechanism 46a, and a fourth hydraulic line 44b that extends between and fluidly connects the second hydraulic line 42 to a second pressurizing mechanism 46b. In the illustrated example, the hydraulic lines 40, 42, 44a, 44b are made of flexible tubing (e.g., hydraulic hoses), but other conduit structures and/or fluid passageways can be used alone or in combination with one another.

The first and third hydraulic lines 40, 44a thus form at least part of a first hydraulic circuit 48 that interconnects the first working chambers 32, 36 of the right and left dampers 22, 24 and the first pressurizing mechanism 46a. Meanwhile, the second and fourth hydraulic lines 42, 44 form at least part of a second hydraulic circuit 50 that interconnects the second working chambers 34, 38 of the right and left dampers 22, 24 and the second pressurizing mechanism 46b. In other words, the first pressurizing mechanism 46a is connected in fluid communication with the first hydraulic circuit 48 and the second pressurizing mechanism 46 is connected in fluid communication with the second hydraulic circuit 50. Thus, the first working chambers 32, 36 of the right and left dampers 22, 24 are connected in fluid communication with one another and hydraulic fluid can flow between the first working chambers 32, 36 of the right and left dampers 22, 24 via the first hydraulic line 40 and between the first hydraulic line 40 and the first pressurizing mechanism 46a via the third hydraulic line 44a. The second working chambers 34, 38 of the right and left dampers 22, 24 are connected in fluid communication with one another and hydraulic fluid can flow between the second working chambers 34, 38 of the right and left dampers 22, 24 via the second hydraulic line 42 and between the second hydraulic line 42 and the second pressurizing mechanism 46b via the fourth hydraulic line 44b.

It should also be appreciated that there is no cross-over between the first and second hydraulic lines 40, 42 or the first and second hydraulic circuits 48, 50 outside of the right and left dampers 22, 24 and as such that first and second hydraulic circuits 48, 50 are arranged in parallel with one another (i.e., are parallel hydraulic circuits). It should be appreciated that this does not necessarily mean that the first and second hydraulic lines 40, 42 have to run parallel to one another, it simply means that the first hydraulic line 40 extends between and fluidly connects to the first working chambers 32, 36 of the right and left dampers 22, 24 and that second hydraulic line 42 extends between and fluidly connects to the second working chambers 34, 38 of the right and left dampers 22, 24, which is different from the embodiments shown in FIGS. 4 and 5, where the first and second hydraulic lines 40, 42 cross-over one another.

The first hydraulic circuit 48 includes a first pair of variable flow control valves 70, 72 that are configured to regulate fluid flow between the first hydraulic circuit 48 and the first working chambers 32, 36 of the right and left dampers 22, 24. Similarly, the second hydraulic circuit 50 includes a second pair of variable flow control valves 74, 76 that are configured to regulate fluid flow between the second hydraulic circuit 50 and the second working chambers 34, 38 of the right and left dampers 22, 24. The first variable flow control valve 70 is positioned between the first working chamber 32 of the right damper 22 and the first hydraulic line 40, while the second variable flow control valve 72 is positioned between the first working chamber 36 of the left damper 24 and the first hydraulic line 40. The third variable flow control valve 74 is positioned between the second working chamber 34 of the right damper 22 and the second hydraulic line 42, while the fourth variable flow control valve 76 is positioned between the second working chamber 38 of the left damper 24 and the second hydraulic line 42. By way of example and without limitation, the variable flow control valves 70, 72, 74, 76 may be electromechanical valves with a combination of passive spring-disk elements and a solenoid. The solenoid of the variable flow control valves 70, 72, 74, 76 may be electrically connected to and actuated by one of the controllers 60, 60' to change the damping characteristics of the right damper 22 and/or left damper 24 (e.g., to soften or firm up the ride).

The single axle suspension system 20 also includes first and second bridge lines 92, 94 that extend between and interconnect the first hydraulic line 40 and therefore the first hydraulic circuit 48 and the second hydraulic line 42 and therefore the second hydraulic circuit 50. In particular, the first bridge line 92 connects to the first and second hydraulic lines 40, 42 at positions located between the right damper 22 and the intersection between the first and third hydraulic lines 40, 44a, while the second bridge line 94 connects to the first and second hydraulic lines 40, 42 at positions located between the left damper 24 and the and the intersection between the second and fourth hydraulic lines 42, 44b. A first shut-off valve 85 is positioned in the first bridge line 92 between the first and second hydraulic circuits 48, 50 and a second shut-off valve 87 is positioned in the second bridge line 94 between the first and second hydraulic circuits 48, 50. When the first and second shut-off valves 85, 87 are closed, a pressure differential between the first and second hydraulic circuits 48, 50 can be maintained to provide roll resistance. This pressure differential will equalize when the first and second shut-off valves 85, 87 are open, which can be used to provide a comfort setting/operating mode. By way of example and without limitation, the shut-off valves 85, 87 may be electromechanical valves with a solenoid that may be electrically connected to and actuated by one of the controllers 60, 60' to open and close the shut-off valves 85, 87.

The single axle suspension system 20 also includes a first accumulator 66 and a second accumulator 68. In this embodiment, the first and second accumulators 66, 68 are external to the first and second pressurizing mechanisms 46a, 46b and are both connected in fluid communication with the second hydraulic line 42. The first and second accumulators 66, 68 may be constructed in a number of different ways. For example and without limitation, the first and second accumulators 66, 68 may have accumulation chambers and pressurized gas chambers that are separated by floating pistons or flexible membranes.

Each of the first and second pressurizing mechanisms 46a, 46b includes a ball/screw mechanism 52a, 52b to adjust the volume of a variable volume chamber 54a, 54b. The first and second pressurizing mechanisms 46a, 46b provide active heave control by adding and removing hydraulic fluid to and from the first and second hydraulic circuits 48, 50. Each of the first and second pressurizing mechanisms 46a, 46b also includes a cylinder 56a, 56b and the ball/screw mechanism 52a, 52b is configured to actuate a driven piston 58a, 58b that is slidably received in the cylinder 56a, 56b. Each driven piston 58a, 58b is moveable in a first direction to decrease the volume of the variable volume chamber 54a, 54b within the cylinder 56a, 56b and push hydraulic fluid out of the variable volume chamber 54a, 54b and into the third hydraulic line 44a (with respect to the first pressurizing mechanism 46a) to increase static pressure in the first hydraulic circuit 48 and into the fourth hydraulic line 44b (with respect to the second pressurizing mechanism 46b) to increase static pressure in the second hydraulic circuit 50. Each driven piston 58a, 58b is also moveable in a second direction to increase the volume of the variable volume chamber 54a, 54b within the cylinder 56a, 56b and draw hydraulic fluid from either the third hydraulic line 44a or the fourth hydraulic line 44b into the variable volume chamber 54a, 54b to decrease static pressure in the first or second hydraulic circuits 48, 50.

Controller 60 is electronically connected to the first and second pressurizing mechanisms 46a, 46b. The controller 60 includes a processor and memory that is programmed to initiate active heave control operations by actuating the first and second pressurizing mechanism 46a, 46b either simultaneously or independently. In the illustrated examples, the controller 60 is electronically connected to a first motor 62a that drives the ball/screw mechanism 52a of the first pressurizing mechanism 46a and is also electronically connected to a second motor 62b that drives the ball/screw mechanism 52b of the second pressurizing mechanism 46b. However, it should be appreciated that the single-axle suspension system 20 could alternatively include two separate controllers, one for each pressurizing mechanism 46a, 46b.

Actuation of the first pressurizing mechanism 46a either increases and decreases the static pressure inside the first hydraulic line 40, the third hydraulic line 44a, and the first work chambers 32, 36 of the right and left dampers 22, 24 in a manner that is independent of damper movements. Similarly, actuation of the second pressurizing mechanism 46b either increases and decreases the static pressure inside the second hydraulic line 42, the fourth hydraulic line 44b, and the second working chambers 34, 38 of the right and left dampers 22, 24 in a manner that is independent of damper movements. This allows the single axle suspension system 20 to counteract heave where the front of the vehicle may dive and the rear of the vehicle may lift (such as during hard braking) or where the front of the vehicle may lift and the rear of the vehicle may squat (such as during hard acceleration).

The single axle suspension system 20 includes a third pressurizing mechanism 46c a first pumping mechanism in the form of a first impeller 95a and a second pumping mechanism in the form of a second impeller 95b. Thus, the third pressurizing mechanism 46c is a dual impeller bi-directional pump assembly 93. The first and second impellers 95a, 95b may be supported on or mounted on a common shaft 97, which is rotationally driven by a motor 99 (i.e., an electric motor). The first impeller 95a is arranged in fluid communication with and is configured to pump fluid through the first hydraulic line 40 in two opposing directions (e.g., to the right or to the left) depending on the rotational direction that the first impeller 95a is turning in (e.g., clockwise or counterclockwise). The second impeller 95b is arranged in fluid communication with and is configured to pump fluid through the second hydraulic line 42 in two opposing directions (e.g., to the right or to the left) depending on the rotational direction that the second impeller 95b is turning in (e.g., clockwise or counterclockwise).

The dual impeller bi-directional pump assembly 93 is configured such that the first and second impellers 95a, 95b act (i.e., pump) simultaneously in opposite directions. In other words, the dual impeller bi-directional pump assembly 93 is configured such that the first impeller 95a pumps fluid in the first hydraulic line 40 in a direction moving away from the right damper 22 and towards the left damper 24 while, at the same time, the second impeller 95b pumps fluid in the second hydraulic line 42 in a direction moving towards the right damper 22 and away from the left damper 24, and vice versa.

As shown in FIG. 1, the first and second impellers 95a, 95b may be fixed to the common shaft 97 and therefore may rotate in the same direction. The second hydraulic line 42 may include right and left segments 47a, 47b that cross one another at crossing point 98. The right segment 47a of the second hydraulic line 42 extends between the right damper 22 and a left side of the dual impeller bi-directional pump assembly 93 while the left segment 47b of the second hydraulic line 42 extends between the left damper 24 and a right side of the dual impeller bi-directional pump assembly 93. As a result, fluid flow through the second hydraulic circuit 50 is reversed relative to the fluid flow through the first hydraulic circuit 48 even though the first and second impellers 95a, 95b rotate in the same direction (e.g., both the first and second impellers 95a, 95b rotate in a clockwise direction or in a counterclockwise direction, depending on the direction of rotation of the common shaft 97). As an alternative, the first hydraulic line 40 could be broken up into two crossing segments as described above instead of the second hydraulic line 42 to achieve the same effect. As another alternative, gears (not shown) may be utilized to enable the motor 99 to drive the first and second impellers 95a, 95b in opposite rotational directions (e.g., where the motor 99 to drives the first impeller 95a in a clockwise direction and the second impeller 95b in a counterclockwise direction or vice versa). In such a configuration, the first and second impellers 95a, 95b can simply be mounted in-line with the first and second hydraulic lines 40, 42.

The motor 99 of the third pressurizing mechanism 46c is electronically connected to controller 60', which is programmed to initiate active roll control operations. The controller 60' includes a processor and memory that is programmed to initiate active roll control operations by energizing the motor 99 to simultaneously drive rotation of the first and second impellers 95a, 95b. It should be appreciated that the two separate controllers 60, 60' illustrated in FIG. 1 could alternatively be combined into a single control that provides active heave and roll control.

Controller 60 initiates active heave control operations by energizing the motors 62a, 62b to drive the driven pistons 58a, 58b of the first and second pressurizing mechanism 46a, 46b in the first and second directions to increase or decrease the static pressure in the first and second hydraulic circuits 48, 50. Typically, for active heave control, the controller 60 will energizing the motors 62a, 62b simultaneously to drive the driven pistons 58a, 58b in opposite directions to increase the static pressure in the first hydraulic circuit 48 while decreasing the static pressure in the second hydraulic circuit 50 to resist extension movements of the dampers 22, 24 or to decrease the static pressure in the first hydraulic circuit 48 while increasing the static pressure in the second hydraulic circuit 50 to resist compression movements of the dampers 22, 24. However, the controller 60 may also energize just one of the motors 62a, 62b to drive just one of the driven pistons 58a, 58b in either the first or second direction to increase of decrease the static pressure in just one of the first and second hydraulic circuits 48, 50.

Controller 60' initiates active roll control by energize the motor 99 to drive rotation of the shaft 97 is either a clockwise direction or a counter-clockwise direction. When the motor 99 drives rotation of the shaft 97 and therefore the first and second impellers 95a, 95b in the clockwise direction, the first impellers 95a of the third pressurizing mechanism 46c pumps fluid in the first hydraulic line 40 in a direction moving away from the left damper 24 and towards the right damper 22 while, at the same time, the second impeller 95b pumps fluid in the second hydraulic line 42 in a direction moving towards the left damper 24 and away from the right damper 24. When the motor 99 drives rotation of the shaft 97 and therefore the first and second impellers 95a, 95b in the counter-clockwise direction, the third pressurizing mechanism 46c pumps fluid in the first hydraulic line 40 in a direction moving away from the right damper 22 and towards the left damper 24 while, at the same time, the second impeller 95b pumps fluid in the second hydraulic line 42 in a direction moving towards the right damper 22 and away from the left damper 24.

The active heave and roll control operations performed by the controller(s) 60, 60' may be responsive to measurements taken by a first pressure sensor 64a that is connected to the third hydraulic line 44a and a second pressure sensor 64b that is connected to the fourth hydraulic line 44b. In the illustrated examples, the first pressure sensor 64a is connected in fluid communication with the third hydraulic line 44a and is therefore configured to measure the static pressure in the first hydraulic circuit 48 and the second pressure sensor 64b is connected in fluid communication with the fourth hydraulic line 44b and is therefore configured to measure the static pressure in the second hydraulic circuit 50.

Notwithstanding the above description and drawings contained herein, which illustrate the first and second pumping mechanisms as impellers, it should be appreciated that the first and second pumping mechanisms may have alternative pump constructions, including without limitation, positive-displacement pumps, axial-flow pumps, diaphragm pumps, and centrifugal pumps.

Figure 2:
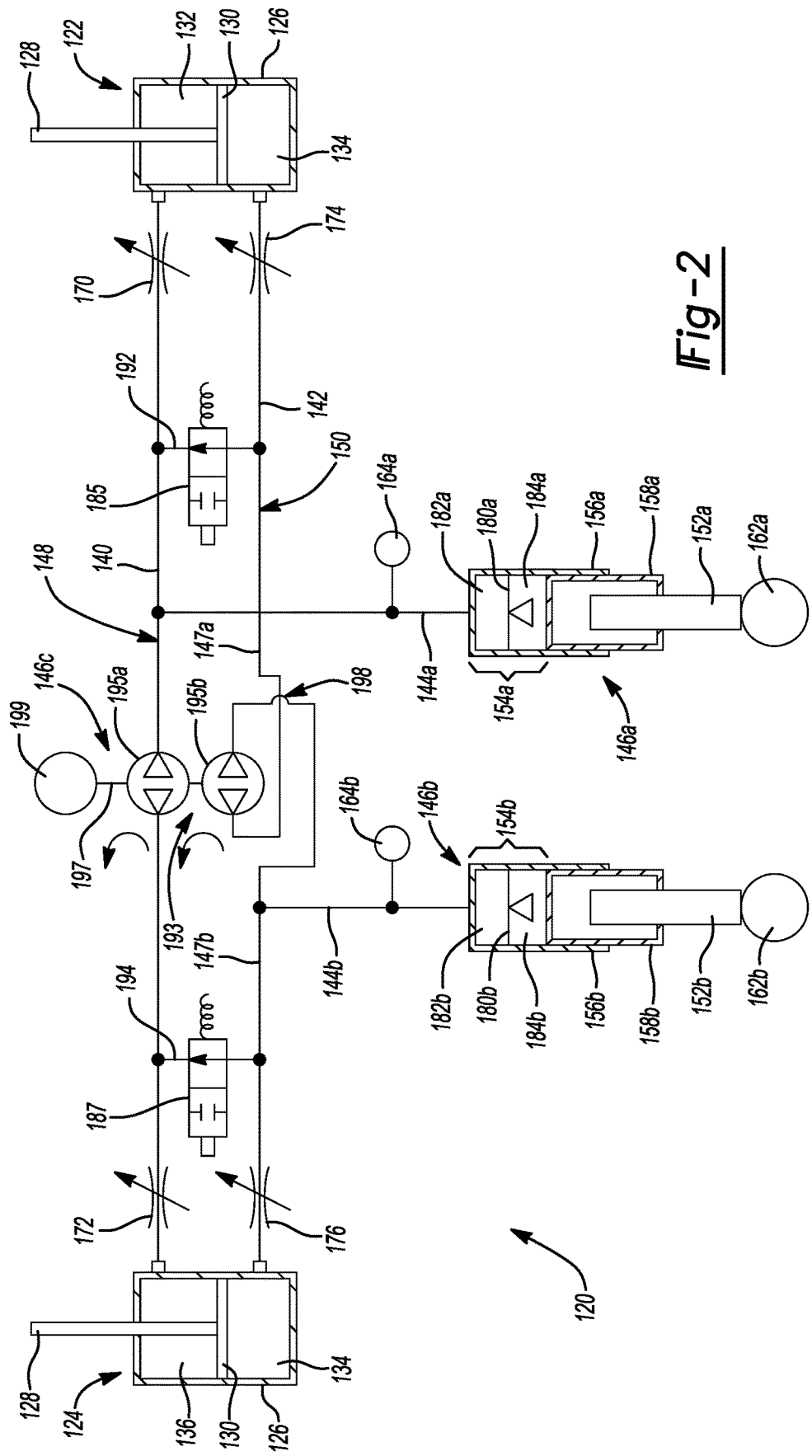
FIG. 2 is a schematic diagram illustrating another exemplary single axle suspension system that is similar to that shown in FIG. 1, but the first and second pressurizing mechanisms having floating pistons in their variable volume chambers.

FIG. 2 illustrates another single axle suspension system 120 that shares many of the same components as the single axle suspension system 20 illustrated in FIG. 1, but in FIG. 2 the first and second accumulators 66, 68 have been eliminated and the first and second pressurizing mechanisms 146a, 146b are constructed to perform accumulator functions in addition to increasing or decreasing the static pressure in the first and second hydraulic circuits 148, 150. Rather than repeat the description set forth above, the following paragraphs describe the structure and function of the components in FIG. 2 that are new and/or different from those shown and described in connection with FIG. 1. It should be appreciated that the reference numbers in FIG. 2 are "100" series numbers (e.g., 120, 122, 124, etc.), but otherwise share the same base reference numbers as the corresponding elements in FIG. 1. Thus, the same description for elements 20, 22, 24 above applies to elements 120, 122, 124 in FIG. 2 and so on and so forth, except as otherwise noted.

As noted above, the first and second pressurizing mechanisms 146a, 146b of the single axle suspension system 120 illustrated in FIG. 2 perform additional accumulator functions, which eliminates the need for separate accumulators attached to the first and second hydraulic circuits 148, 150. As shown in FIG. 2, each of the first and second pressurizing mechanisms 146a, 146b further includes a floating piston 180a, 180b that divides each variable volume chamber 154a, 154b into a fluid chamber 182a, 182b that is filled with hydraulic fluid and a gas chamber 184a, 184b that is filled with a compressible gas. The gas chamber 184a, 184b is positioned between the floating piston 180a, 180b and the driven piston 158a, 158b. The fluid chamber 182a of the first pressurizing mechanism 146a is arranged in fluid communication with the third hydraulic line 144a, while the fluid chamber 182b of the second pressurizing mechanisms 146b is arranged in fluid communication with the fourth hydraulic line 144b. Thus, the first pressurizing mechanism 146a is configured to provide active heave control by adding and removing hydraulic fluid to and from the first hydraulic circuit 148, which in turn increases and decreases the static pressure inside the first hydraulic line 140, the third hydraulic line 144a, and the first working chambers 132, 136 of the right and left dampers 122, 124 in a manner that is independent of damper movements. The second pressurizing mechanism 146b is configured to provide active heave control by adding and removing hydraulic fluid to and from the second hydraulic circuit 150, which in turn increases and decreases the static pressure inside the second hydraulic line 142, the fourth hydraulic line 144b, and the second working chambers 134, 138 of the right and left dampers 122, 124 in a manner that is independent of damper movements.

Figure 3:
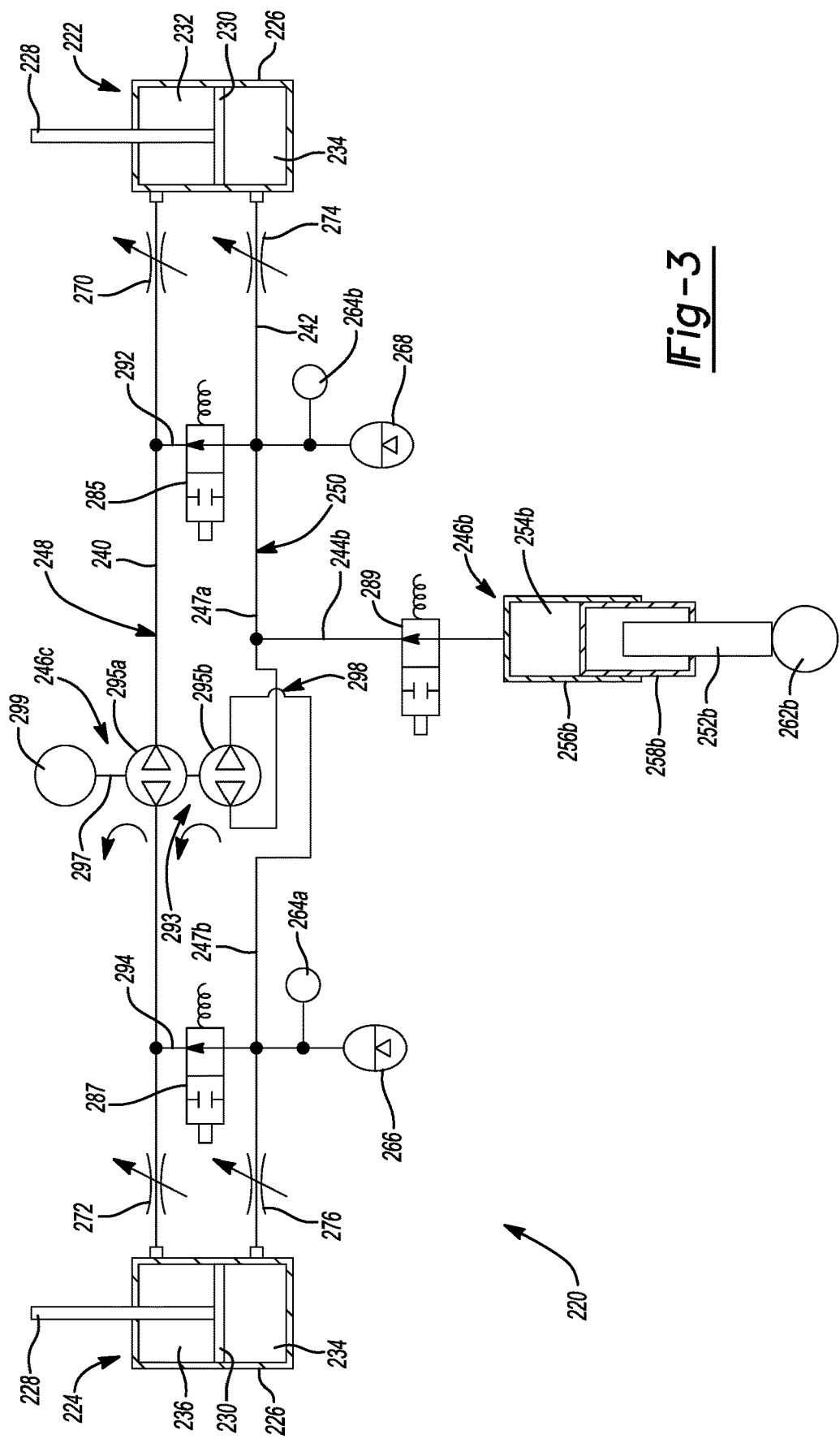
FIG. 3 is a schematic diagram illustrating another exemplary single axle suspension system that is similar to that shown in FIG. 1, but the first pressurizing mechanism has been eliminated.

FIG. 3 illustrates another single axle suspension system 220 that shares many of the same components as the single axle suspension system 20 illustrated in FIG. 1, but in FIG. 3 the first pressurizing mechanism 46a shown in FIG. 1 has been eliminated. Rather than repeat the description set forth above, the following paragraphs describe the structure and function of the components in FIG. 3 that are new and/or different from those shown and described in connection with FIG. 1. It should be appreciated that the reference numbers in FIG. 3 are "200" series numbers (e.g., 220, 222, 224, etc.), but otherwise share the same base reference numbers as the corresponding elements in FIG. 1. Thus, the same description for elements 20, 22, 24 above applies to element 220, 222, 224 in FIG. 3 and so on and so forth, except as otherwise noted.

The single axle suspension system 220 illustrated in FIG. 3 includes just two pressurizing mechanisms 246b, 246c. Pressurizing mechanism 246b includes a ball/screw mechanism 252b to adjust the volume of a variable volume chamber 254b, which is arranged in fluid communication with the second hydraulic circuit 250 via hydraulic line 244b. Pressurizing mechanisms 246b also includes a cylinder 256b and the ball/screw mechanism 252b is configured to actuate a driven piston 258b that is slidably received in the cylinder 256b in first and second directions to add and remove hydraulic fluid to and from the second hydraulic circuit 250 and therefore change the static pressure within the second hydraulic circuit 250 to provide active heave control.

Pressurizing mechanism 246c includes a dual impeller bi-directional pump assembly 293 with first and second impellers 295a, 295b that are mounted on a common shaft 297, which is rotationally driven by a motor 299. The first impeller 295a is arranged in fluid communication with and is configured to pump fluid through the first hydraulic line 240 in two opposing directions (e.g., to the right or to the left) and the second impeller 295b is arranged in fluid communication with and is configured to pump fluid through the second hydraulic line 242 in two opposing directions (e.g., to the left or to the right) to provide active roll control.

First and second bridge lines 292, 294 extend between and interconnect the first hydraulic line 240 and therefore the first hydraulic circuit 248 and the second hydraulic line 242 and therefore the second hydraulic circuit 250 on each side of pressurizing mechanism 246c. A first shut-off valve 285 is positioned in the first bridge line 292 between the first and second hydraulic circuits 248, 250 and a second shut-off valve 287 is positioned in the second bridge line 294 between the first and second hydraulic circuits 248, 250. Finally, a third shut-off valve 289 is positioned in hydraulic line 244b between pressurizing mechanism 246b and the second hydraulic line 242.

In FIG. 3, a first accumulator 266 is connected at the junction between the first bridge line 292 and the second hydraulic line 242 and a second accumulator 268 is connected at the junction between the second bridge line 294 and the second hydraulic line 242. In addition, a first pressure sensor 264a is connected between the first accumulator 266 and the junction between the first bridge line 292 and the second hydraulic line 242 and a second pressure sensor 264b is connected between the second accumulator 268 and the junction between the second bridge line 294 and the second hydraulic line 242.

Figure 4:
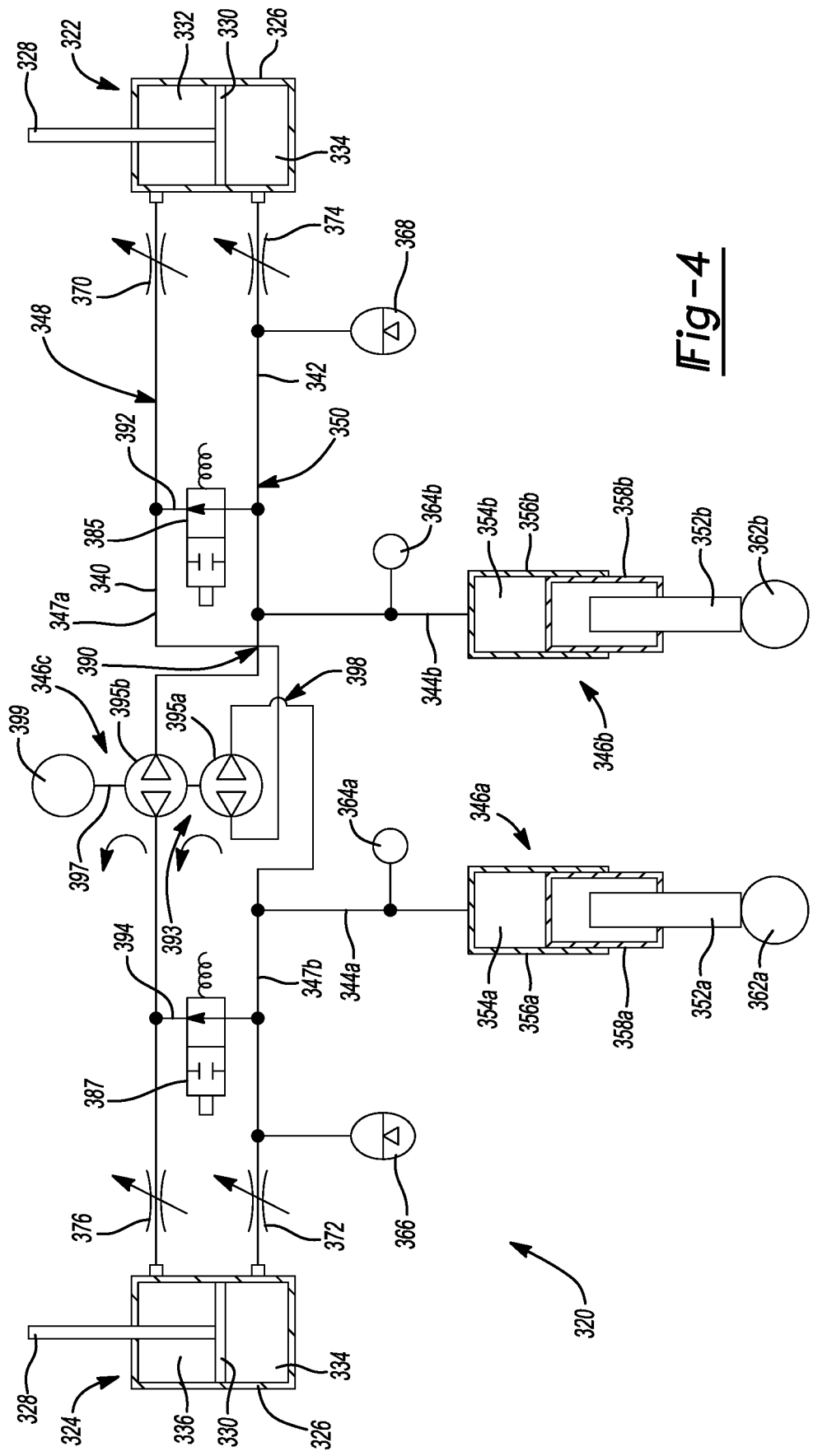
FIG. 4 is a schematic diagram illustrating an exemplary single axle suspension system that is constructed in accordance with the present disclosure, where the single axle suspension system includes first and second pressurizing mechanisms that have driven pistons and variable volume chambers and a third pressurizing mechanisms in the form of a dual impeller bi-directional pump that is arranged in fluid communication with two cross-over hydraulic circuits.

FIG. 4 illustrates another single axle suspension system 320 that shares many of the same components as the single axle suspension system 20 illustrated in FIG. 1, but in FIG. 4 the first and second hydraulic lines 340, 342 cross over one another at cross-over point 390. Rather than repeat the description set forth above, the following paragraphs describe the structure and function of the components in FIG. 4 that are new and/or different from those shown and described in connection with FIG. 1. It should be appreciated that the reference numbers in FIG. 4 are "300" series numbers (e.g., 320, 322, 324, etc.), but otherwise share the same base reference numbers as the corresponding elements in FIG. 1. Thus, the same description for elements 20, 22, 24 above applies to element 320, 322, 324 in FIG. 4 and so on and so forth, except as otherwise noted.

In FIG. 4, the single axle suspension system 320 includes a plurality of hydraulic lines 340, 342, 344a, 344b. The plurality of hydraulic lines 340, 342, 344a, 344b includes: a first hydraulic line 340 that extends between and fluidly connects to the first working chamber 332 of the right damper 322 and the second working chamber 338 of the left damper 324, a second hydraulic line 342 that extends between and fluidly connects to the second working chamber 334 of the right damper 322 and the first working chamber 336 of the left damper 324, a third hydraulic line 344a that extends between and fluidly connects the first hydraulic line 340 to a first pressurizing mechanism 346a, and a fourth hydraulic line 344b that extends between and fluidly connects the second hydraulic line 342 to a second pressurizing mechanism 346b. As such, the first and second hydraulic lines 340, 342 cross-over one another at a cross-over point 390.

The first hydraulic circuit 348 includes a first accumulator 366 and the second hydraulic circuit 350 includes a second accumulator 368. In this embodiment, the first and second accumulators 366, 368 are external to the first and second pressurizing mechanisms 346a, 346b. In particular, the first accumulator 366 is connected in fluid communication with the first hydraulic line 340 and the second accumulator 368 is connected in fluid communication with the second hydraulic line 342. The first hydraulic circuit 348 also includes a first pair of variable flow control valves 370, 372 that are configured to regulate fluid flow between the first working chamber 332 of the right damper 322 and the second working chamber 338 of the left damper 324 with the first hydraulic circuit 348. Similarly, the second hydraulic circuit 350 includes a second pair of variable flow control valves 374, 376 that are configured to regulate fluid flow between the first working chambers 336 of the left damper 324 and the second working chamber 334 of the right damper 322 with the second hydraulic circuit 350. The first variable flow control valve 370 is positioned between the first working chamber 332 of the right damper 322 and the first hydraulic line 340, while the second variable flow control valve 372 is positioned between the second working chamber 338 of the left damper 324 and the first hydraulic line 340. The third variable flow control valve 374 is positioned between the second working chamber 334 of the right damper 322 and the second hydraulic line 342, while the fourth variable flow control valve 376 is positioned between the first working chamber 336 of the left damper 324 and the second hydraulic line 342. The variable flow control valves 370, 372, 374, 376 are electromechanical valves and are controlled by a controller to change the damping characteristics of the right damper 322 and/or left damper 324 (e.g., to soften or firm up the ride).

The single axle suspension system 320 in FIG. 4 includes first and second bridge lines 392, 394 that extend between and interconnect the first hydraulic line 340 and therefore the first hydraulic circuit 348 and the second hydraulic line 342 and therefore the second hydraulic circuit 350 on each side of the cross-over point 390 and the third pressurizing mechanism 346c. In other words, the first bridge line 392 connects to the first and second hydraulic lines 340, 342 at positions located between the right damper 322 and the cross-over point 390, while the second bridge line 394 connects to the first and second hydraulic lines 340, 342 at positions located between the left damper 324 and the cross-over point 390. A first shut-off valve 385 is positioned in the first bridge line 392 between the first and second hydraulic circuits 348, 350 and a second shut-off valve 387 is positioned in the second bridge line 394 between the first and second hydraulic circuits 348, 350. When the first and second shut-off valves 385, 387 are closed, a pressure differential between the first and second hydraulic circuits 348, 350 can be maintained to provide roll resistance. This pressure differential will equalize when the first and second shut-off valves 385, 387 are open, which can be used to provide a comfort setting/operating mode.

In FIG. 4, the first pressurizing mechanism 346a is connected at the junction between the first bridge line 392 and the first hydraulic line 340 and the second pressurizing mechanism 346b is connected at the junction between the second bridge line 394 and the second hydraulic line 342. Accordingly, the first hydraulic line 340 and the third hydraulic line 344a form at least part of a first hydraulic circuit 348 that interconnects the first working chamber 332 of the right damper 322 and the second working chamber 338 of the left damper 324 with the first pressurizing mechanism 346a. Meanwhile, the second hydraulic line 342 and the fourth hydraulic line 344b form at least part of a second hydraulic circuit 350 that interconnects the second working chamber 334 of the right damper 322 and the first working chamber 336 of the left damper 324 with the second pressurizing mechanism 346b. In other words, the first pressurizing mechanism 346a is connected in fluid communication with the first hydraulic circuit 348 and the second pressurizing mechanism 346b is connected in fluid communication with the second hydraulic circuit 350. As such, the first working chamber 332 of the right damper 322 and the second working chamber 338 of the left damper 324 are connected in fluid communication with one another and hydraulic fluid can flow between the first working chamber 332 of the right damper 322 and the second working chamber 338 of the left damper 324 via the first hydraulic line 340 and between the first hydraulic line 340 and the first pressurizing mechanism 346a via the third hydraulic line 344a. The second working chamber 334 of the right damper 322 and the first working chamber 336 of the left damper 324 are connected in fluid communication with one another and hydraulic fluid can flow between the second working chamber 334 of the right damper 322 and the first working chamber 336 of the left damper 324 via the second hydraulic line 342 and between the second hydraulic line 342 and the second pressurizing mechanism 346a via the fourth hydraulic line 344b.

Actuation of the first pressurizing mechanism 346a either increases and decreases the static pressure inside the first hydraulic line 340, the third hydraulic line 344a, the first work chamber 332 of the right damper 322 and the second working chamber 338 of the left damper 324 in a manner that is independent of damper movements. Similarly, actuation of the second pressurizing mechanism 346b either increases and decreases the static pressure inside the second hydraulic line 342, the fourth hydraulic line 344b, the first working chamber 336 of the left damper 324, and the second working chambers 334 of the right damper 322 in a manner that is independent of damper movements. Activation of the third pressurizing mechanism 346c where the shaft 397 and thus the first and second impellers 395a, 395b rotate in a clockwise direction causes hydraulic fluid to flow through the first hydraulic line 340 from the first working chamber 332 of the right damper 322 to the second working chamber 338 of the left damper 324 and hydraulic fluid to flow through the second hydraulic line 342 from the first working chamber 336 of the left damper 324 to the second working chambers 334 of the right damper 322.

The first hydraulic line 340 included right and left segments 347a, 437b that cross one another at crossing point 398. The right segment 347a of the first hydraulic line 340 extends between the right damper 322 and a left side of the dual impeller bi-directional pump assembly 393 while the left segment 347b of the first hydraulic line 340 extends between the left damper 324 and a right side of the dual impeller bi-directional pump assembly 393. As a result, fluid flow through the first hydraulic circuit 348 is reversed relative to the fluid flow through the second hydraulic circuit 350 even though the first and second impellers 395a, 395b rotate in the same direction (e.g., both the first and second impellers 395a, 395b rotate in a clockwise direction or in a counterclockwise direction, depending on the direction of rotation of the common shaft 397). As an alternative, the second hydraulic line 342 could be broken up into two crossing segments as described above instead of the first hydraulic line 340 to achieve the same effect. As another alternative, gears (not shown) may be utilized to enable the motor 399 to drive the first and second impellers 395a, 395b in opposite rotational directions (e.g., where the motor 399 to drives the first impeller 395a in a clockwise direction and the second impeller 395b in a counterclockwise direction or vice versa).

Activation of the third pressurizing mechanism 346c where the shaft 397 and thus the first and second impellers 395a, 395b rotate in a counter-clockwise direction causes hydraulic fluid to flow through the first hydraulic line 340 from the second working chamber 338 of the left damper 324 to the first working chamber 332 of the right damper 322 and hydraulic fluid to flow through the second hydraulic line 342 from the second working chambers 334 of the right damper 322 to the first working chamber 336 of the left damper 324. The controller(s) initiate active roll control operations by energizing the motors 362a, 362b of the first and second pressurizing mechanisms 346a, 346b to drive the driven pistons 358a, 358b in the first and second directions to increase or decrease the static pressure in the first and second hydraulic circuits 48, 50 and/or by energizing the motor 399 of the third pressurizing mechanism 346c to rotate the shaft 397 and thus the first and second impellers 395a, 395b rotate in either the clockwise or counter-clockwise direction. Typically, for active roll control, the controller(s) will energizing the motors 362a, 362b of the first and second pressurizing mechanisms 346a, 346b simultaneously to drive the driven pistons 358a, 358b in opposite directions to increase the static pressure in the first hydraulic circuit 348 while decreasing the static pressure in the second hydraulic circuit 350, in the case of a right turn for example, or vice versa, to resist vehicle roll and maintain a flat corning posture of the vehicle. However, the controller(s) may also energize just one of the motors 362a, 362b to drive just one of the driven pistons 358a, 358b in either the first or second direction to increase of decrease the static pressure in just one of the first and second hydraulic circuits 348, 350 to increase suspension articulation, for example, if the vehicle is traveling off-road or over an obstacle or pot-hole. The active roll control operations performed by the controller(s) may also include energizing the third pressurizing mechanism 346c to further increase or decrease the fluid pressure within the first and second hydraulic circuits 48, 50.

Figure 5:
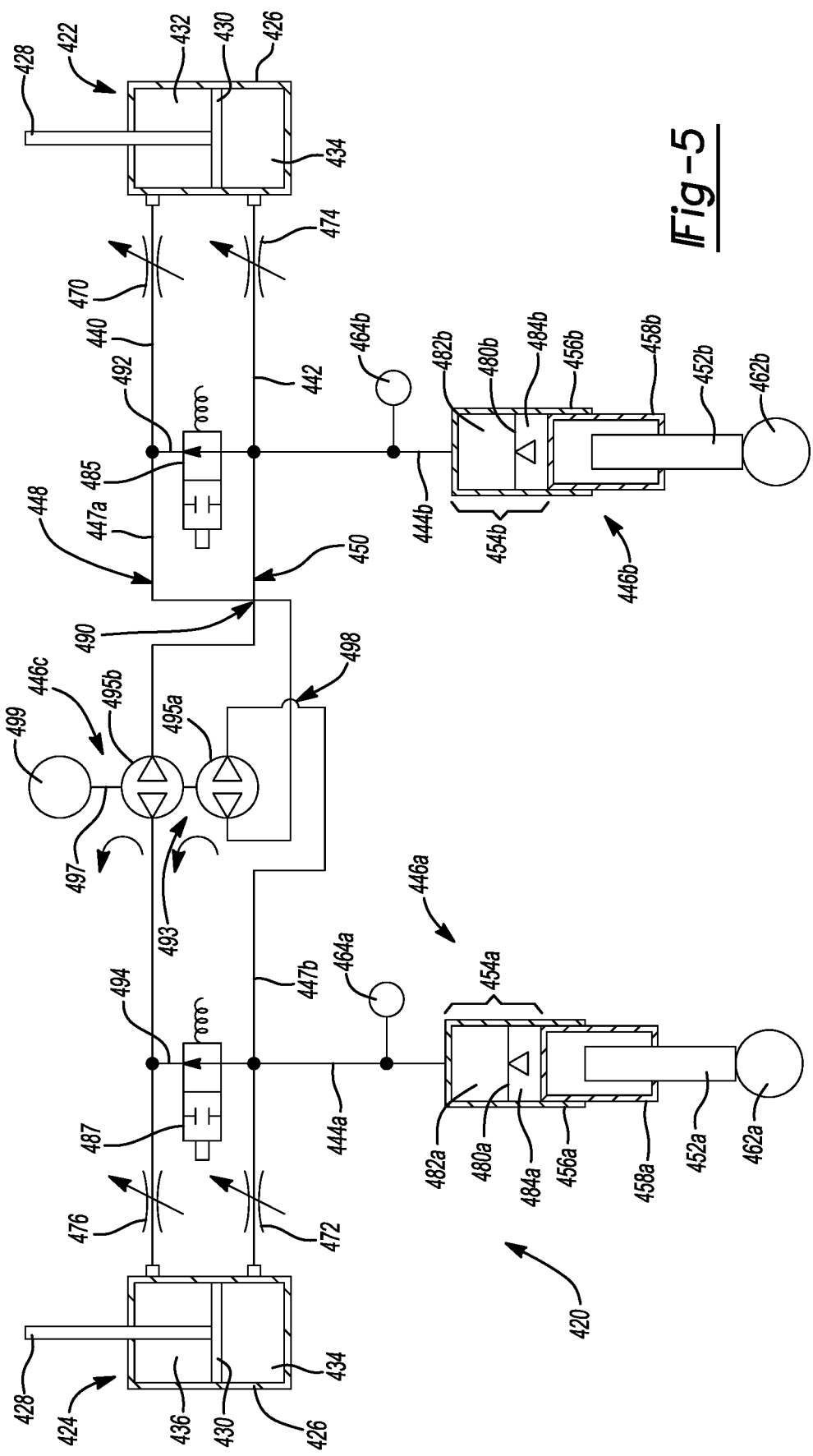
FIG. 5 is a schematic diagram illustrating another exemplary single axle suspension system that is similar to that shown in FIG. 4, but the first and second pressurizing mechanisms having floating pistons in their variable volume chambers.

FIG. 5 illustrates another single axle suspension system 420 that shares many of the same components as the single axle suspension system 320 illustrated in FIG. 4, but in FIG. 5 the first and second accumulators 366, 368 have been eliminated and the first and second pressurizing mechanisms 446a, 446b are constructed to perform accumulator functions in addition to increasing or decreasing the static pressure in the first and second hydraulic circuits 448, 450. Rather than repeat the description set forth above, the following paragraphs describe the structure and function of the components in FIG. 5 that are new and/or different from those shown and described in connection with FIG. 4. It should be appreciated that the reference numbers in FIG. 5 are "400" series numbers (e.g., 420, 422, 424, etc.), but otherwise share the same base reference numbers as the corresponding elements in FIG. 4. Thus, the same description for elements 320, 322, 324 above applies to elements 420, 422, 424 in FIG. 5 and so on and so forth, except as otherwise noted.

As noted above, the first and second pressurizing mechanisms 446a, 446b of the single axle suspension system 420 illustrated in FIG. 5 perform additional accumulator functions, which eliminates the need for separate accumulators attached to the first and second hydraulic circuits 448, 450. As shown in FIG. 5, each of the first and second pressurizing mechanisms 446a, 446b further includes a floating piston 480a, 480b that divides each variable volume chamber 454a, 454b into a fluid chamber 482a, 482b that is filled with hydraulic fluid and a gas chamber 484a, 484b that is filled with a compressible gas. The gas chamber 484a, 484b is positioned between the floating piston 480a, 480b and the driven piston 458a, 458b. The fluid chamber 482a of the first pressurizing mechanism 446a is arranged in fluid communication with the third hydraulic line 444a, while the fluid chamber 482b of the second pressurizing mechanisms 446b is arranged in fluid communication with the fourth hydraulic line 444b. Thus, the first pressurizing mechanism 446a is configured to provide active roll control by adding and removing hydraulic fluid to and from the first hydraulic circuit 448, which in turn increases and decreases the static pressure inside the first hydraulic line 440, the third hydraulic line 444a, the first working chamber 432 of the right dampers 422, and the second working chamber 438 of the left damper 424 in a manner that is independent of damper movements. The second pressurizing mechanism 446b is configured to provide active roll control by adding and removing hydraulic fluid to and from the second hydraulic circuit 450, which in turn increases and decreases the static pressure inside the second hydraulic line 442, the fourth hydraulic line 444b, and the second working chamber 434 of the right damper 422, and the first working chamber 436 of the left damper 424 in a manner that is independent of damper movements.

Many other modifications and variations of the present disclosure are possible in light of the above teachings and may be practiced otherwise than as specifically described while within the scope of the appended claims.

What is claimed is:

1. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
first and second hydraulic circuits extending between and interconnecting the working chambers of the right and left dampers;
at least one pressurizing mechanism including a variable volume chamber that is connected in fluid communication with at least one of the first and second hydraulic circuits and a driven piston that is moveable in first and second directions to increase and decrease the volume of the variable volume chamber and therefore increase and decrease static pressure within at least one of the first and second hydraulic circuits independent of damper movements; and
a bi-directional pump with a first pumping mechanism that is arranged in fluid communication with the first hydraulic circuit, a second pumping mechanism that is arranged in fluid communication with the second hydraulic circuit, wherein the first pumping mechanism is configured to pump the hydraulic fluid through the first hydraulic circuit from the right damper to the left damper and the second pumping mechanism is configured to simultaneously pump the hydraulic fluid through the second hydraulic circuit from the left damper to the right damper in a first roll control operating mode, and wherein the first pumping mechanism is configured to pump the hydraulic fluid through the first hydraulic circuit from the left damper to the right damper and the second pumping mechanism is configured to simultaneously pump the hydraulic fluid through the second hydraulic circuit from the right damper to the left damper in a second roll control operating mode.

2. The single axle suspension system set forth in claim 1, wherein the at least one pressurizing mechanism includes a first pressurizing mechanism that is connected in fluid communication with the first hydraulic circuit and a second pressurizing mechanism that is connected in fluid communication with the second hydraulic circuit.

3. The single axle suspension system set forth in claim 2, wherein each of the first and second pressurizing mechanisms further includes a floating piston that divides the variable volume chamber into a fluid chamber that is filled with the hydraulic fluid and is arranged in fluid communication with one of the first and second hydraulic circuits and a gas chamber positioned between the floating piston and the driven piston that is filled with a compressible gas such that the first and second pressurizing mechanisms additionally perform accumulator functions.

4. The single axle suspension system set forth in claim 1, wherein movement of the driven piston of the at least one pressurizing mechanism in the first direction decreases the volume in the variable volume chamber and pushes the hydraulic fluid out of the variable volume chamber and into at least one of the first and second hydraulic circuits to cause an increase in the static pressure within at least one of the first and second hydraulic circuits and wherein movement of the driven piston of the at least one pressurizing mechanism in the second direction increases the volume in the variable volume chamber and draws the hydraulic fluid into the variable volume chamber from at least one of the first and second hydraulic circuits to cause a decrease in the static pressure within at least one of the first and second hydraulic circuits.

5. The single axle suspension system set forth in claim 1, wherein the at least one pressurizing mechanism includes a ball/screw mechanism that is configured to operably drive movement of the driven piston in the first and second directions.

6. The single axle suspension system set forth in claim 1, wherein the first hydraulic circuit includes a first hydraulic line that extends between and connects the first working chamber of the right damper and the first working chamber of the left damper, the second hydraulic circuit includes a second hydraulic line that extends between and connects the second working chamber of the right damper and the second working chamber of the left damper, and there is no cross-over of the first and second hydraulic lines.

7. The single axle suspension system set forth in claim 1, wherein the first hydraulic circuit includes a first hydraulic line that extends between and connects the first working chamber of the right damper and the second working chamber of the left damper, the second hydraulic circuit includes a second hydraulic line that extends between and connects the second working chamber of the right damper and the first working chamber of the left damper, and the first and second hydraulic circuits cross-over one another at a cross-over point.

8. The single axle suspension system set forth in claim 1, wherein the first pumping mechanism is a first impeller, the second pumping mechanism is a second impeller, and both the first and second impellers are rotatably driven by a single motor.

9. The single axle suspension system set forth in claim 1, further comprising:
a first bridge line extending between and interconnecting the first and second hydraulic circuits at a location that is positioned between the right damper and the bi-directional pump;
a second bridge line extending between and interconnecting the first and second hydraulic circuits at a location that is positioned between the left damper and the bi-directional pump;
a first shut-off valve positioned in the first bridge line and a second shut-off valve positioned in the second bridge line, wherein a pressure differential between the first and second hydraulic circuits is enabled when the first and second shut-off valves are closed to provide roll resistance and wherein the pressure differential between the first and second hydraulic circuits will equalize when the first and second shut-off valves are open.

10. The single axle suspension system set forth in claim 1, wherein the first hydraulic circuit includes a first pair of variable flow control valves that are configured to regulate fluid flow between the first hydraulic circuit and the working chambers of the right and left dampers and wherein the second hydraulic circuit includes a second pair of variable flow control valves that are configured to regulate fluid flow between the second hydraulic circuit and the working chambers of the left and right dampers.

11. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic line extending between and connecting the first working chamber of the right damper and the first working chamber of the left damper;
a second hydraulic line extending between and connecting the second working chamber of the right damper and the second working chamber of the left damper;
at least one pressurizing mechanism including a variable volume chamber that is connected in fluid communication with at least one of the first and second hydraulic lines and a driven piston that is moveable in first and second directions to increase and decrease the volume of the variable volume chamber and therefore increase and decrease static pressure within at least one of the first and second hydraulic lines independent of damper movements; and
a bi-directional pump with a first impeller that is arranged in fluid communication with the first hydraulic line, a second impeller that is arranged in fluid communication with the second hydraulic line, and a motor that is configured to drive rotation of the first and second impellers to simultaneously pump the hydraulic fluid through the first and second hydraulic lines in opposing directions.

12. The single axle suspension system set forth in claim 11, wherein the at least one pressurizing mechanism includes a first pressurizing mechanism that is connected in fluid communication with the first hydraulic circuit and a second pressurizing mechanism that is connected in fluid communication with the second hydraulic circuit.

13. The single axle suspension system set forth in claim 12, wherein each of the first and second pressurizing mechanisms further includes a floating piston that divides the variable volume chamber into a fluid chamber that is filled with the hydraulic fluid and is arranged in fluid communication with one of the first and second hydraulic circuits and a gas chamber positioned between the floating piston and the driven piston that is filled with a compressible gas such that the first and second pressurizing mechanisms additionally perform accumulator functions.

14. The single axle suspension system set forth in claim 11, further comprising:
first and second accumulators that are arranged in fluid communication with at least one of the first and second hydraulic lines and are external to the at least one pressurizing mechanism.

15. The single axle suspension system set forth in claim 11, wherein the at least one pressurizing mechanism includes a ball/screw mechanism that is configured to operably drive movement of the driven piston in the first and second directions.

16. A single axle suspension system, comprising:
right and left dampers each including a damper housing, a piston rod, and a piston that is mounted on the piston rod and arranged in sliding engagement inside the damper housing such that the piston divides the damper housing into first and second working chambers;
a first hydraulic line extending between and connecting the first working chamber of the right damper and the second working chamber of the left damper;
a second hydraulic line extending between and connecting the second working chamber of the right damper and the first working chamber of the left damper;
at least one pressurizing mechanism including a variable volume chamber that is connected in fluid communication with at least one of the first and second hydraulic lines and a driven piston that is moveable in first and second directions to increase and decrease the volume of the variable volume chamber and therefore increase and decrease static pressure within at least one of the first and second hydraulic lines independent of damper movements; and
a bi-directional pump with a first impeller that is arranged in fluid communication with the first hydraulic line, a second impeller that is arranged in fluid communication with the second hydraulic line, and a motor that is configured to drive rotation of the first and second impellers to simultaneously pump the hydraulic fluid through the first and second hydraulic lines in opposing directions.

17. The single axle suspension system set forth in claim 16, wherein the at least one pressurizing mechanism includes a first pressurizing mechanism that is connected in fluid communication with the first hydraulic circuit and a second pressurizing mechanism that is connected in fluid communication with the second hydraulic circuit.

18. The single axle suspension system set forth in claim 17, wherein each of the first and second pressurizing mechanisms further includes a floating piston that divides the variable volume chamber into a fluid chamber that is filled with the hydraulic fluid and is arranged in fluid communication with one of the first and second hydraulic circuits and a gas chamber positioned between the floating piston and the driven piston that is filled with a compressible gas such that the first and second pressurizing mechanisms additionally perform accumulator functions.

19. The single axle suspension system set forth in claim 16, further comprising:
first and second accumulators that are arranged in fluid communication with at least one of the first and second hydraulic lines and are external to the at least one pressurizing mechanism.

20. The single axle suspension system set forth in claim 16, wherein the at least one pressurizing mechanism includes a ball/screw mechanism that is configured to operably drive movement of the driven piston in the first and second directions.

* * * * *